US012774359B2

(12) United States Patent
Brocas et al.

(10) Patent No.: US 12,774,359 B2
(45) Date of Patent: Oct. 27, 2026

(54) SUSPENSION POLYMERIZATION OF ALKOXYAMINES WITH STYRENIC AND (METH)ACRYLIC MONOMERS

(71) Applicant: Arkema France, Colombes (FR)

(72) Inventors: Anne-Laure Brocas, Lacq (FR); Sylvain Bourrigaud, Lacq (FR); Céline Labarthe, Lacq (FR); Patrick Saury, Lacq (FR)

(73) Assignee: Arkema France, La Défense (FR)

( * ) Notice: Subject to any disclaimer, the term of this patent is extended or adjusted under 35 U.S.C. 154(b) by 596 days.

(21) Appl. No.: 18/266,517

(22) PCT Filed: Dec. 9, 2021

(86) PCT No.: PCT/FR2021/052267

§ 371 (c)(1),
(2) Date: Jun. 9, 2023

(87) PCT Pub. No.: WO2022/123185

PCT Pub. Date: Jun. 16, 2022

(65) Prior Publication Data

US 2024/0043599 A1 Feb. 8, 2024

(30) Foreign Application Priority Data

Dec. 10, 2020 (FR) ....................................... 2012988

(51) Int. Cl.

| | |
|---|---|
| ***C08F 293/00*** | (2006.01) |
| ***B33Y 70/00*** | (2020.01) |

(52) U.S. Cl.

CPC ........... *C08F 293/005* (2013.01); *B33Y 70/00* (2014.12); *C08F 2438/02* (2013.01)

(58) Field of Classification Search

USPC .................................................. 525/301, 308

See application file for complete search history.

(56) References Cited

U.S. PATENT DOCUMENTS

| | | | |
|---|---|---|---|
| 7,199,214 B2 | 4/2007 | Couturier et al. | |
| 8,013,062 B2 | 9/2011 | Ruzette et al. | |
| 2010/0261832 A1 | 10/2010 | Magnet et al. | |
| 2017/0369622 A1* | 12/2017 | Inoubli .................. | B33Y 10/00 |

FOREIGN PATENT DOCUMENTS

| | | |
|---|---|---|
| EP | 0683182 A2 | 5/1995 |
| EP | 1526138 A1 | 4/2005 |
| FR | 2924714 A1 | 6/2009 |

(Continued)

OTHER PUBLICATIONS

Ballard, et al, "Nitroxide mediated suspension polymerization of methacrylic monomers," Chemical Engineering Journal 316 (2017) 655-662. (Year: 2017).*

(Continued)

*Primary Examiner* — Fred M Teskin

(74) *Attorney, Agent, or Firm* — Buchanan Ingersoll & Rooney PC

(57) ABSTRACT

The present invention relates to a process for the suspension polymerization of alkoxyamines with styrenic and (meth) acrylic monomers, to the beads and compositions thus obtained, and also to the use of these beads and compositions.

10 Claims, 5 Drawing Sheets

(56) References Cited

FOREIGN PATENT DOCUMENTS

WO 03062293 A1 7/2003

OTHER PUBLICATIONS

Taube, et al, "TEMPO-controlled radical suspension polymerization of poly(styrene)-block-poly(styrene-co-acrylonitrile) and poly(styrene)-block-poly(styrene-co-butyl methacrylate)," Macromol. Mater. Eng. 279, 26-33 (2000). (Year: 2000).*

International Search Report and Written Opinion for International Application No. PCT/FR2021/052267, dated Mar. 29, 2022, 8 pages.

* cited by examiner

[Fig 1]
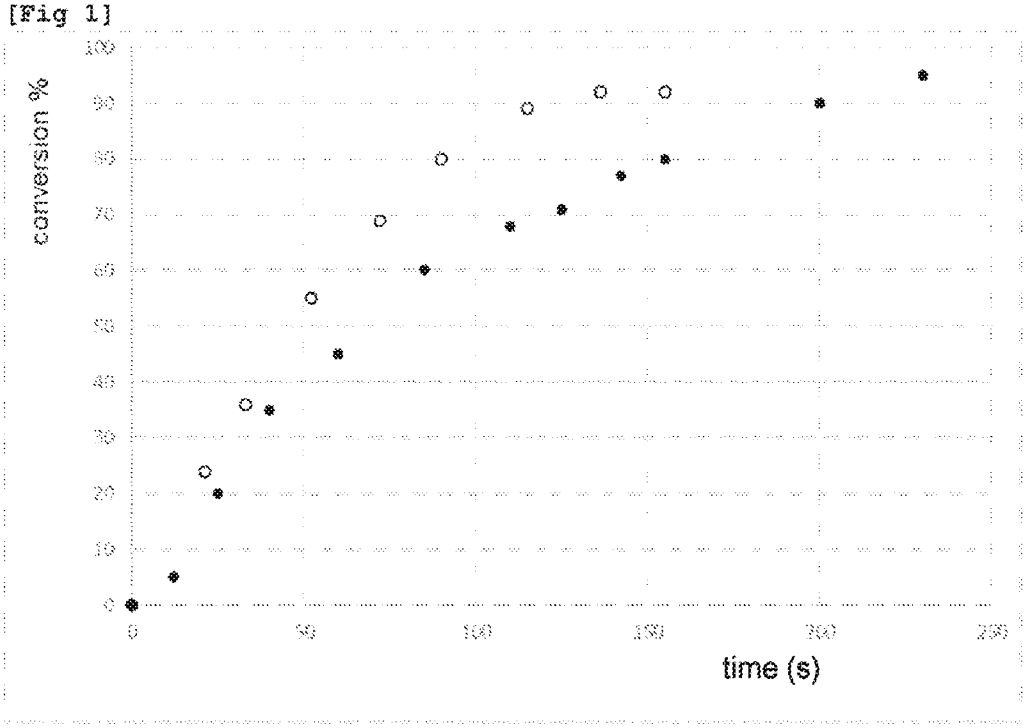
[Fig 2]
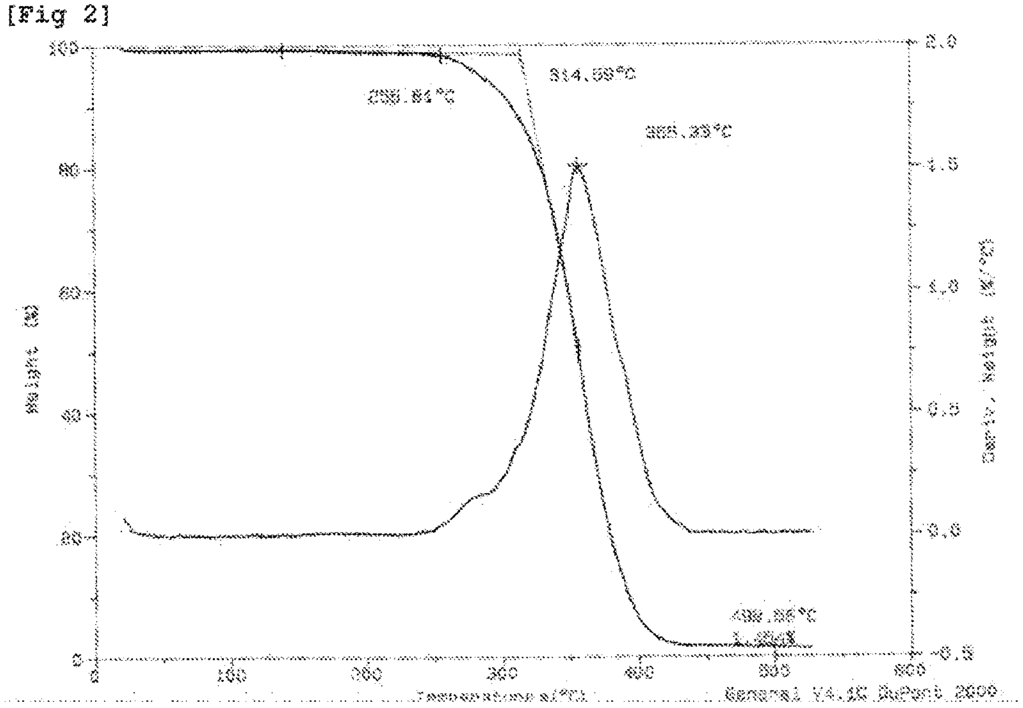

[Fig 3]
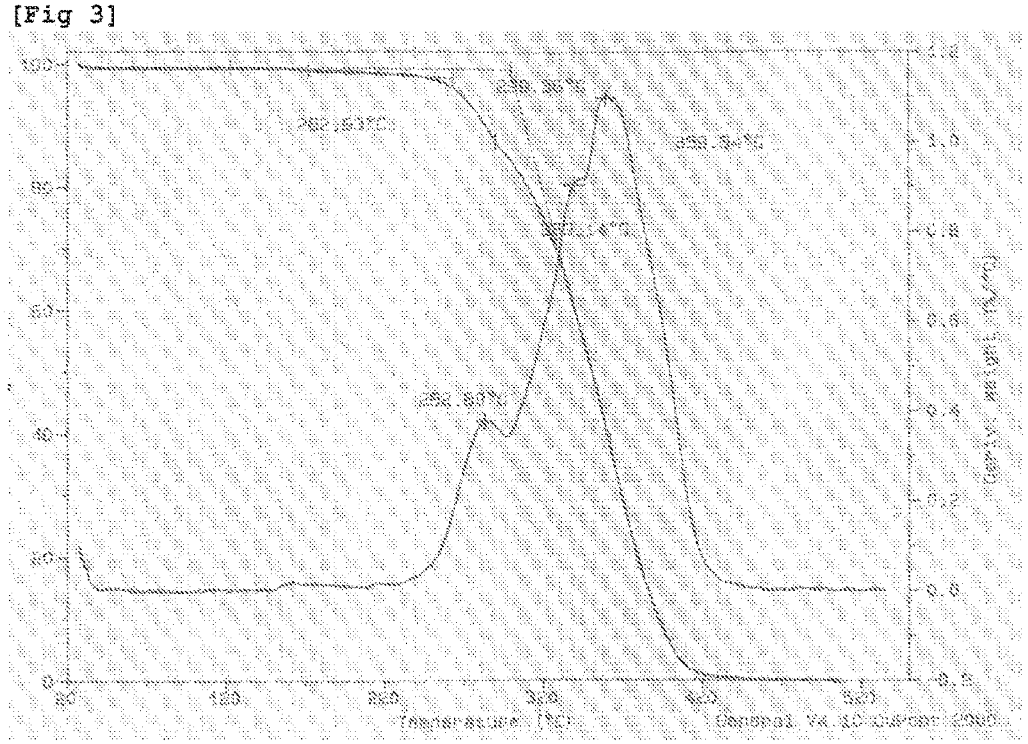
[Fig 4]
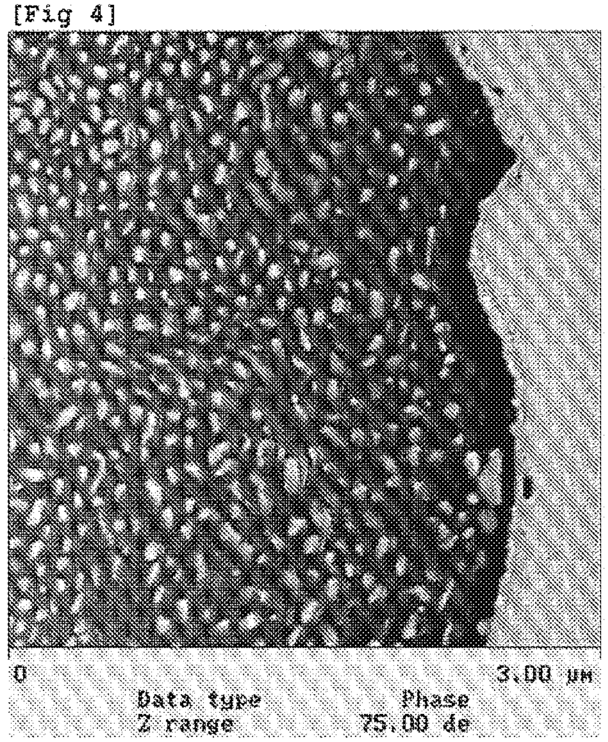

[Fig 5]
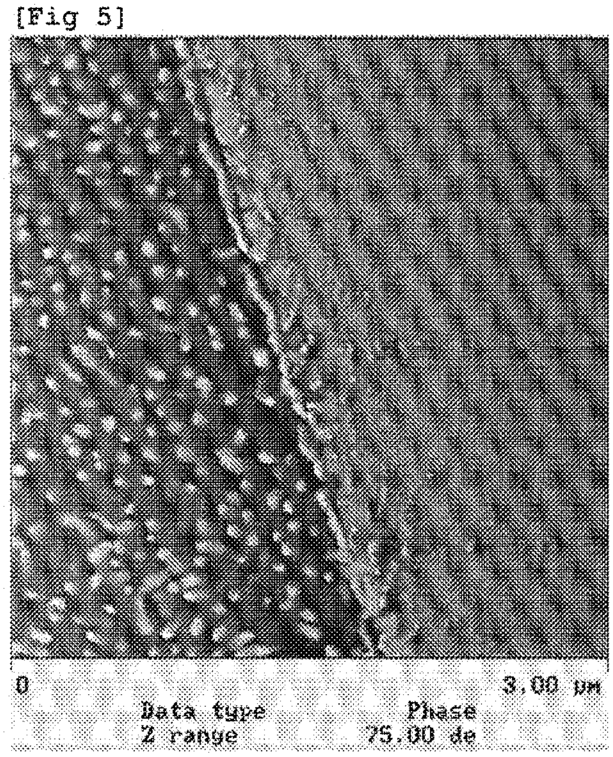
[Fig 6]
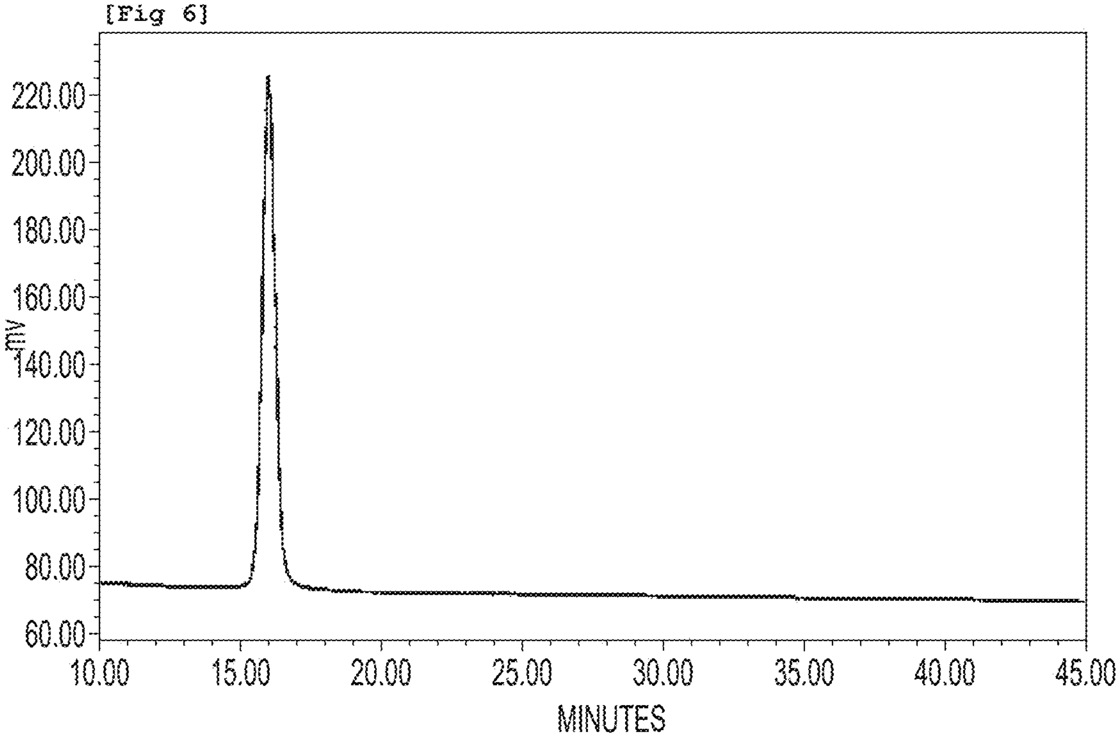

[Fig 7]
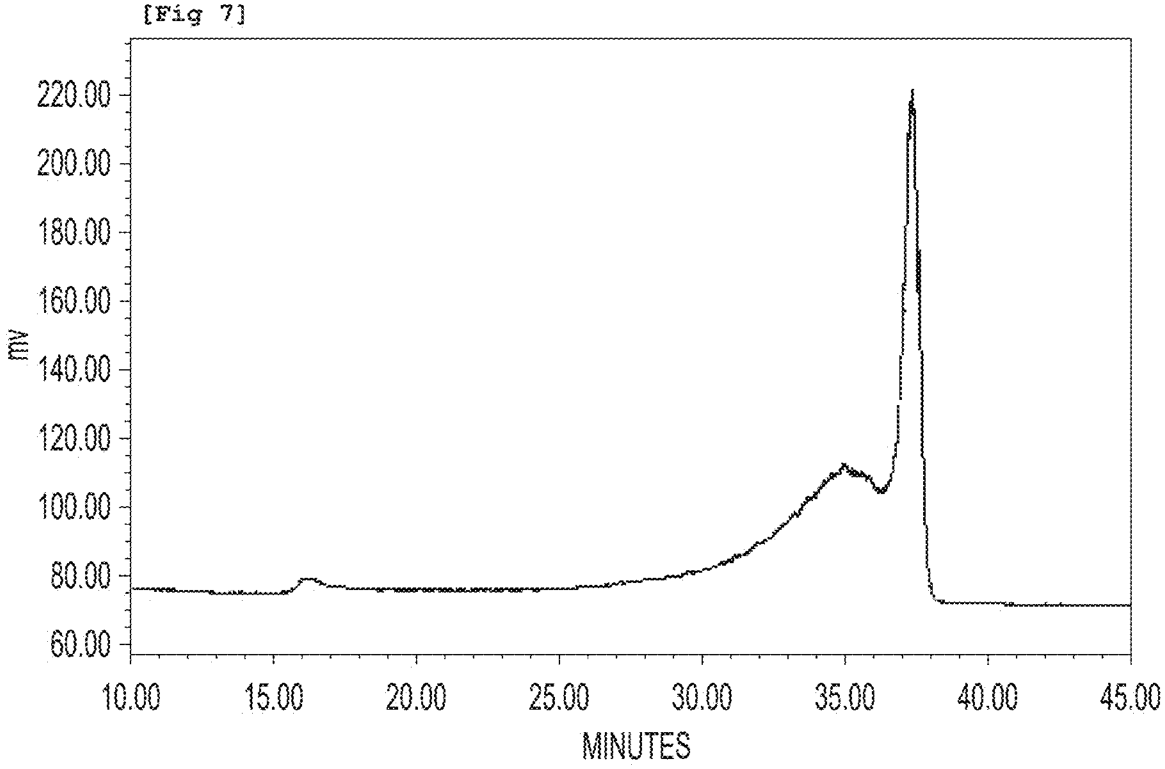
[Fig 8]
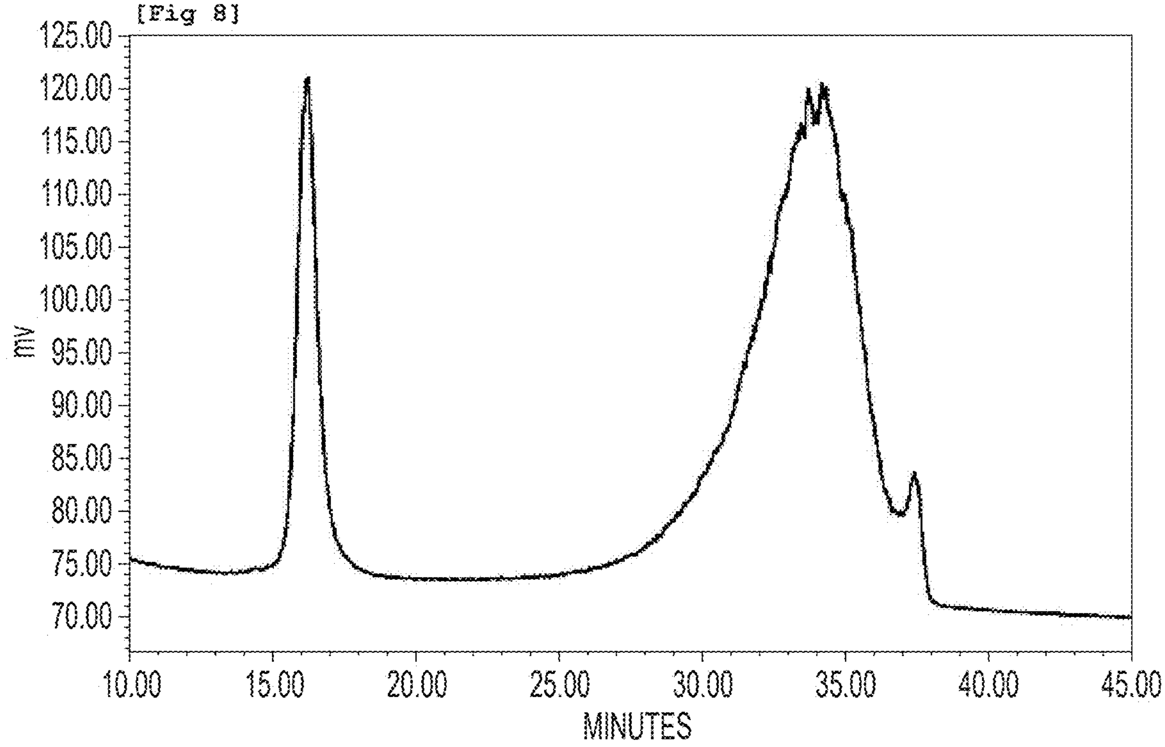

[Fig 9]
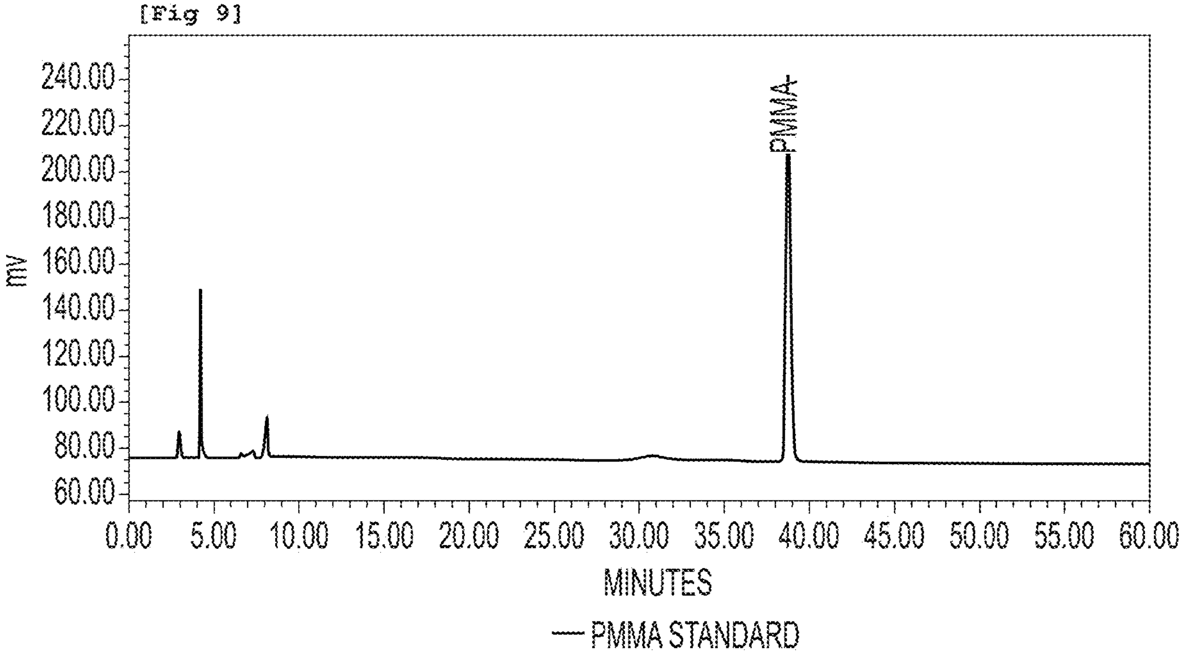

SUSPENSION POLYMERIZATION OF ALKOXYAMINES WITH STYRENIC AND (METH)ACRYLIC MONOMERS

CROSS-REFERENCE TO RELATED APPLICATIONS

This application is a 371 filing of International Application No. PCT/FR2021/052267, filed Dec. 9, 2021, which claims priority to French Application No. FR2012988 filed Dec. 10, 2020, the disclosures of these applications being incorporated herein by reference in their entireties for all purposes.

FIELD OF THE INVENTION

The present invention relates to a process for the suspension polymerization of alkoxyamines with styrenic and (meth)acrylic monomers, to the beads and compositions thus obtained, and also to the use of these beads and compositions.

BACKGROUND OF THE INVENTION

The search for processes leading to ever more efficient materials is necessary in order to improve some of their properties.

Block copolymers are polymers that are difficult to manufacture, but they have advantages due to their block structure, which allows the establishment and adjustment of morphologies at the nanometric scale. Their physical behavior such as mechanical behavior, optical behavior for example, and chemical behavior such as their resistance to chemical agents are superior to homopolymers or random copolymers.

Some synthesis processes allow or negate the combination of these physical and chemical behaviors into targeted properties.

The chemistries and synthetic processes used to manufacture them can be ionic, controlled radical and condensation polymerizations, operated in bulk, solvent, emulsion and suspension. Depending on the case, the dispersity of the block copolymers obtained can approach 1. In the context of the present invention, the Applicant is interested in compositions of (meth)acrylic and/or styrenic block copolymers prepared by the controlled radical polymerization of nitroxides (nitroxide mediated polymerization, NMP) involving alkoxyamines, and more particularly in block copolymer compositions which have at least one soft block within the block copolymers, that is to say having a Tg measured by DSC of less than 0° C., and at least one hard block within the block copolymers, that is to say having a Tg measured by DSC of greater than 20° C.

In NMP, alkoxyamines are used which, by balancing the radicals with a nitroxide released at a certain temperature, make it possible to control the polymerization of the blocks. This technology is described for example in the article by Nicolas J. et al, Progress in Polymer Science 38 (2013) 63-235. With alkoxyamine chemistry, the dispersity of the block copolymers can vary from 1.2 to 2 depending on the conversion at which the polymerization is conducted.

To avoid excessive drift in the dispersity of the block copolymer obtained, it is sometimes necessary to limit the conversion. This results in unconverted monomers, which must be removed.

For example, to prepare a di-block copolymer, a monofunctional alkoxyamine is reacted in a reactor in the presence of a first monomer or group of monomers M1 in a solvent or not up to a conversion of approximately 70%, then the monomers M1 which remain are removed, generally by evaporation. The macro-alkoxyamine obtained is then placed in the presence of a second monomer or group of monomers M2 to form the second block and follows the same process of conversion/removal of M2. A PolyM1-PolyM2 di-block copolymer is then obtained.

This method makes it possible to obtain products with targeted properties, but the conditions of the process impose a penalty on some of these properties, such as optical or thermal properties, without a link being able to be made between impurities or the exact nature of the block copolymers thus manufactured.

A second process, called emulsion, has been attempted, but the transfer to an industrial scale is complicated (synthesis, recovery of the product).

A third, so-called suspension process seems to have advantages when it comes to obtaining compositions of copolymers which make it possible to maximize certain properties such as mechanical, thermal or optical properties. The compositions obtained by this suspension process differ because a portion of the monomers are obtained in the form of homopolymer or random copolymer and not block copolymers.

Suspension polymerization involves polymerizing the reaction mixture within droplets dispersed in water. For this, use is made of effective agitation in the reactor and of a "suspension" agent, allowing the preparation of beads or balls whose diameters can vary or even be adjusted from a few microns to a few hundred microns.

Unlike bulk or solvent processes, there is no solvent, and the presence of water in the suspension process allows the manufacture of materials with much higher optical qualities. The use of these compositions is possible in applications where optical quality is sought, when products resulting from polymerization in bulk or in a solvent do not afford this possibility. Furthermore, the products resulting from this process prove to be more thermally stable in the context of the present invention.

Unlike a bulk or solvent process, stopping the conversion to limit dispersity drift is not possible or is complex to implement in a suspension process.

During the synthesis of the first Poly M1 block, the conversion is maximized even if it means suffering a drift in the dispersity of the block obtained.

In the second conversion step of the second monomer or group of monomers, it is appropriate to choose the various chemical agents allowing effective conversion of the monomers M2 into polymer blocks by seeking to minimize the defects which may appear at the chain ends of the copolymers obtained.

In Chemical Engineering Journal 316 (2017) 655-662, Ballard et al set out the suspension polymerization of methacrylic monomers in the presence of alkoxyamines. This suspension process uses as an alkoxyamine the structure 3-(((2-cyanopropan-2-yl)oxy)(cyclohexyl)amino)-2,2-dimethyl-3 phenylpropanenitrile.

It allows the controlled radical polymerization of methacrylates, but with regard to acrylates, conversions of less than 50% are observed because acrylates give rise to side reactions (Simula A. et al, European Polymer Journal 110 (2019) 319-329). However, the introduction of acrylates into block copolymers is of interest because it allows the use of monomers leading to blocks of very low Tg, unlike methacrylates. Thus, with butyl or 2-ethylhexyl acrylate, Tgs much lower than −20° C. are observed. This makes it possible to obtain materials which have good impact resistance.

In the present invention, the Applicant is interested in a different family of alkoxyamines which makes it possible to polymerize acrylates and/or styrenics in a controlled manner. In the context of the invention, a first block is prepared using acrylate and/or styrenic monomers, the other blocks being made up of blocks composed of methacrylate and/or styrenic entities.

During this second step, which is not a controlled process with this family of alkoxyamines, the applicant sought conditions which allow effective conversion of the methacrylates while minimizing the so-called disproportionation reactions which are specific to them.

Thus, if the first step follows a conventional process of conversion of the first block according to a controlled process, the second step carried out mainly with methacrylates takes place in an uncontrolled way because it is a characteristic of this family of alkoxyamines used in the context of the invention.

Unexpectedly, the presence of a mercaptan from the beginning of this second step does not thwart the process of polymerization from the Poly M1 block, the synthesis of the block copolymer does take place, and random entities are jointly synthesized. The conversion is accelerated when compared to products obtained without the presence of mercaptan (FIG. 1). The products obtained in the presence of mercaptan during the second step are much more thermally stable, as can be verified by thermogravimetric analysis.

In the present invention, the Applicant shows that it is possible to convert up to 90% and even 95% of the monomers within the process resulting from the synthesis of the various blocks.

The small proportions of unconverted monomers are polymerized using a water-soluble initiator at the end of the second step. A surfactant can be added from the first step. Thus, the Applicant was able to verify that the polymer resulting from these low proportions of monomer comes to aggregate on the surface of the beads produced, forming a shell, facilitating the downstream treatment of separation and drying, a problem encountered when the water-soluble initiator is not present.

Another difficulty arises when using bulk or solvent processes. The copolymers obtained have a high viscosity, which complicates the transformation steps, in an extruder or an injection molding machine, for example. At equivalent molecular mass, the compositions of the invention exhibit better fluidity than the products obtained with a bulk process.

With the process of the invention, a composition of block copolymer and of polymer resulting from the radical process linked to the presence of the mercaptan is therefore obtained. This composition has characteristics of the sequence of the monomers or hearts of the copolymers that are different from those obtained using other processes, because the reactivity ratios of the monomers in a suspension process are different (see in particular P. J. Dowding, B. Vincent: *Colloids and Surfaces A: Physicochem. Eng. Aspects* 161 (2000) 263-264. These compositions, which are less well defined in structure than the block copolymers resulting from the bulk process, are therefore new. They nevertheless prove to be effective by exhibiting superior optical properties and better thermal stability.

These new compositions of copolymers obtained using the process of the invention enable uses in applications requiring optical qualities, heat resistance, easy transformation conditions or optimal mechanical performance. They can be used in three-dimensional printing by sintering of beads.

SUMMARY OF THE INVENTION

The invention relates to a process for the suspension polymerization of (meth)acrylic and/or styrenic monomers to obtain beads of a composition comprising at least one block copolymer, comprising the following two successive synthesis steps:

Step 1:

In a stirred reactor comprising water, 0.5 to 4% by mass of a suspension agent and from 0 to 10 000 ppm of a surfactant constituting the aqueous phase, an organic phase is introduced, consisting of at least one alkoxyamine and at least one acrylic and/or styrene monomer with a nitroxide/monomer molar ratio of between 1/50 and 1/1000 and an aqueous phase/organic phase mass ratio of between 3 and 10, said alkoxyamine carrying at least one nitroxide corresponding to the following formula:

[Chem 1]

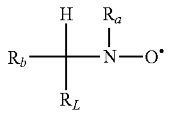

$R_a$ and $R_b$ denoting identical or different alkyl groups having from 1 to 40 carbon atoms, optionally linked together so as to form a ring and optionally substituted by hydroxyl, alkoxy or amino groups, $R_L$ denoting a monovalent group with a molar mass greater than 15.42 g/mol, $R_a$ and $R_b$ denoting identical or different alkyl groups having from 1 to 40 carbon atoms, optionally linked together so as to form a ring and optionally substituted by hydroxyl, alkoxy or amino groups, $R_L$ denoting a monovalent group with a molar mass greater than 15.42 g/mol.

Polymerization of monomers in suspension up to a minimum mass conversion rate of 80% at a temperature of between 15° C. and 140° C.

Stage 2:

Introduction into the previous polymerized suspension of at least one methacrylic and/or styrenic monomer and at least one mercaptan with a mercaptan/nitroxide molar ratio of between 2/1 000 and 8/1000 and with a mass ratio of the monomers (acrylic and/or styrenic)/methacrylic and/or styrenic monomers of between 25/75 and 70/30.

Polymerization with stirring of the monomers up to a minimum conversion rate of 95% at a temperature of between 15° C. and 140° C.

Introduction of an initiator soluble in the aqueous phase to complete the polymerization up to a minimum mass conversion rate of 99% with a rate of between 0.1 and 2% relative to the mass of total organic phase.

Filtration, washing then drying of the beads.

BRIEF DESCRIPTION OF THE DRAWINGS

FIG. 1 is the conversion of methyl methacrylate during step 2 of the process of the invention. The curve with open circles represents the conversion in the presence of mercaptan such as in example 1 of the invention, that comprising filled circles represents the conversion during this same step without mercaptan such as in comparative example 2.

FIG. 2 is the degradation profile as a function of temperature (TGA) of the product obtained in the presence of mercaptan. The temperature at the peak of degradation is 314° C.

FIG. 3 is the degradation profile as a function of temperature (TGA) of the product obtained in the absence of mercaptan, indicating a much more accentuated degradation profile than in the presence of mercaptan. It can be noted that the degradations are more numerous and take place at lower temperatures (282, 290, 300° C.).

FIG. 4 is an atomic force microscopy (AFM) photo of a section of a bead obtained according to the process of the invention with a water-soluble initiator (potassium persulfate). There is a clear crown (PMMA) on the outside of the bead. The interior of the bead is made up of a clear dispersed phase (PMMA) and a dark continuous phase (polybutyl acrylate). Such beads lead to an easily manageable, non-sticky powder.

FIG. 5 is an atomic force microscopy (AFM) photo of a section of a bead obtained according to the process of the invention without a water-soluble initiator. There is a poorly defined diffuse zone on the outside of the bead. The interior of the bead is made up of a clear dispersed phase (PMMA) and a dark continuous phase (polybutyl acrylate). Such beads lead to a difficult-to-manage, sticky powder.

FIG. 6 corresponds to the normalized profile of the LAC chromatogram of a block of PAbu. This polybutyl acrylate corresponds to the block prepared at the end of the first step of the process of the invention. It can therefore be reactivated for the second step of the process of the invention. It is obtained in example 1 at step 2.

FIG. 7 corresponds to the normalized profile of the LAC chromatogram of a composition of the invention. The PAbu alone has almost disappeared (16 minutes' elution), while a peak appears at 35 minutes attributable to a triblock copolymer. At 32 minutes, a peak appears which is attributable to a statistical composition rich in PMMA, originating from the inside of the bead and from the shell.

FIG. 8 corresponds to the normalized profile of the LAC chromatogram of a composition obtained according to a bulk process, as prepared in example 3.

It includes proportions of non-negligible proportions of PAbu which has not been transformed into a triblock. This composition is rich in triblock (peak at 34 minutes). Traces of composition rich in PMMA are visible with a peak at 38 minutes.

FIG. 9 corresponds to the normalized profile of the LAC chromatogram of a PMMA composition. The peaks visible at the start of the elution (before 10 minutes) come from impurities attributed to traces of solvents and other additives present in the commercial grade used for the analysis and should not be taken into account.

DETAILED DESCRIPTION OF THE INVENTION

The invention relates to the suspension polymerization of monomers and alkoxyamines carrying a nitroxide whose general formula (1) is as follows:

[Chem 2]

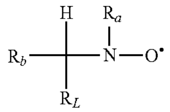

$R_a$ and $R_b$ denoting identical or different alkyl groups having from 1 to 40 carbon atoms, optionally linked together so as to form a ring and optionally substituted by hydroxyl, alkoxy or amino groups, $R_L$ denoting a monovalent group of molar mass greater than 15.42 g/mol, preferably greater than 30 g/mol. The group $R_L$ may have, for example, a molar mass of between 40 and 450 g/mol. It is preferably a phosphorus group of the following general formula:

[Chem 3]

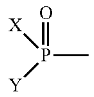

in which X and Y, which may be identical or different, may be chosen from alkyl, cycloalkyl, alkoxy, aryloxy, aryl, aralkyloxy, perfluoroalkyl and aralkyl radicals, and may comprise from 1 to 20 carbon atoms; X and/or Y may also be a halogen atom such as a chlorine, bromine or fluorine atom.

Advantageously, $R_L$ is a phosphonate group of formula:

[Chem 4]

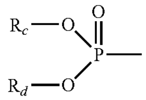

in which $R_c$ and $R_d$ are two identical or different alkyl groups, optionally linked so as to form a ring, comprising from 1 to 40 optionally substituted or unsubstituted carbon atoms.

The group $R_L$ may also comprise at least one aromatic ring such as the phenyl radical or the naphthyl radical, which is substituted, for example, by one or more alkyl radicals comprising from 1 to 10 carbon atoms.

The nitroxides of formula 1 are preferred since they make it possible to obtain effective control of the radical polymerization of the (meth)acrylic monomers, as is taught in WO 03/062293. The alkoxyamines (2) of the following formula having a nitroxide of formula (1) are therefore preferred:

[Chem 5]

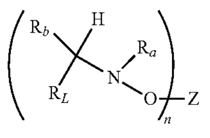

in which:

Z denotes a multivalent group;

By way of example of a nitroxide of formula (1) which can be carried by the alkoxyamine (2), mention may be made of:

N-tert-butyl-1-phenyl-2-methylpropyl nitroxide,

N-(2-hydroxymethylpropyl)-1-phenyl-2-methylpropyl nitroxide,

N-tert-butyl-1-dibenzylphosphono-2,2-dimethylpropyl nitroxide

N-tert-butyl-1-di(2,2,2-trifluoroethyl)phosphono-2,2-dimethylpropyl nitroxide,

N-tert-butyl[(1-diethylphosphono)-2-methylpropyl] nitroxide,

N-(1-methylethyl)-1-cyclohexyl-1-(diethylphosphono) nitroxide,

N-(1-phenylbenzyl)-[(1-diethylphosphono)-1-methylethyl] nitroxide,

N-phenyl-1-diethylphosphono-2,2-dimethylpropyl nitroxide,

N-phenyl-1-diethylphosphono-1-methylethyl nitroxide,

N-(1-phenyl 2-methylpropyl)-1-diethylphosphonomethylethyl nitroxide, or alternatively the nitroxide of formula

[Chem 6]

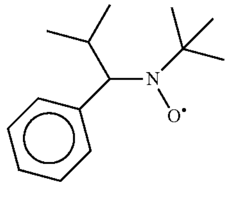

The nitroxide of formula (3) is particularly preferred:

[Chem 7]

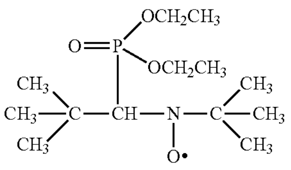

This is N-tert-butyl-1-diethylphosphono-2,2-dimethylpropyl nitroxide.

The preferred alkoxyamines bearing these nitroxides are derived from the following monoalkoxyamine (4):

[Chem 8]

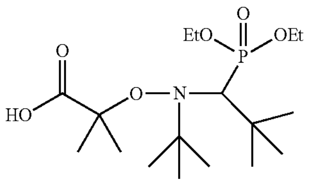

This is 2-([tert-butyl[1-(diethoxyphosphoryl)-2,2-dimethylpropyl]amino]oxy)-2 methylpropionic acid.

This alkoxyamine (4) is monofunctional in terms of alkoxyamine and therefore of nitroxide; it leads to compositions of diblock copolymers in the context of the invention constituting one of the preferences of the invention.

This alkoxyamine (4) can be added to di-, tri- or multifunctional monomers to lead to alkoxyamines which are multifunctional in terms of alkoxyamine and therefore of nitroxide. Such multifunctional alkoxyamines are described in EP1526138. These multifunctional alkoxyamines (5) constitute a second preference of the invention with a preference for the dialkoxyamines (6).

With diacrylate diol $C_2$-$C_{10}$ alkyls, di-alkoxyamines typical of the invention are obtained; they make it possible to prepare compositions of triblock copolymers. Preference will be given preferably to $C_2$ to $C_6$, and more preferably $C_2$-$C_4$, alkyls (ethanediol diacrylate, propanediol diacrylate, butanediol diacrylate). The addition product of the alkoxyamine (4) to the butanediol diacrylate is particularly preferred and leads to the dialkoxyamine (7).

Other di- or multifunctional compounds can be used to prepare the di-, tri- or multi-alkoxyamines which can be used in the context of the invention, whether they are of acrylic or styrenic type.

The monomers used for the preparation of the block copolymer compositions of the invention are chosen from the following list:

Monomers of (meth)acrylic type and vinylaromatic monomers such as styrene or substituted styrenes, in particular alpha-methylstyrene, silylated styrenes, acrylic monomers such as acrylic acid or its salts, alkyl, cycloalkyl or aryl acrylates such as methyl, ethyl, butyl, ethylhexyl or phenyl acrylate, hydroxyalkyl acrylates such as 2-hydroxyethyl acrylate, alkyl ether acrylates such as 2-methoxyethyl acrylate, alkoxy- or aryloxy-polyalkylene glycol acrylates such as methoxypolyethylene glycol acrylates, ethoxypolyethylene glycol acrylates, methoxypolypropylene glycol acrylates, methoxy-polyethylene glycol-polypropylene glycol acrylates or mixtures thereof, aminoalkyl acrylates such as 2-(dimethylamino)ethyl acrylate (ADAME), fluorinated acrylates, isobornyl acrylates, 4 tert-butylcyclohexyl acrylate, silylated acrylates, phosphorus-containing acrylates such as alkylene glycol phosphate acrylates, glycidyl acrylates, dicyclopentenyloxyethyl acrylates, methacrylic monomers such as methacrylic acid or its salts, alkyl, cycloalkyl, alkenyl or aryl methacrylates such as methyl methacrylate (MAM), lauryl, cyclohexyl, allyl, phenyl or naphthyl methacrylate, hydroxyalkyl methacrylates such as 2-hydroxyethyl methacrylate or 2-hydroxypropyl methacrylate, alkyl ether methacrylates such as 2-ethoxyethyl methacrylate, alkoxy- or aryloxy-polyalkylene glycol methacrylates such as methoxypolyethylene glycol methacrylates, ethoxypolyethylene glycol methacrylates, methoxypolypropylene glycol methacrylates, methoxy-polyethylene glycol-polypropylene glycol methacrylates or mixtures thereof, aminoalkyl methacrylates such as 2-(dimethylamino)ethyl methacrylate (MADAME), fluorinated methacrylates such as 2,2,2-trifluoroethyl methacrylate, silylated methacrylates such as 3-methacryloylpropyltrimethylsilane, phosphorus-containing methacrylates such as alkylene glycol phosphate methacrylates, hydroxyethylimidazolidone methacrylate, hydroxyethylimidazolidinone methacrylate, 2-(2-oxo-1-imidazolidinyl)ethyl methacrylate, acrylonitrile, acrylamide or substituted acrylamides, 4-acryloylmorpholine, N-methylolacrylamide, methacrylamide or substituted methacrylamides, N-methylolmethacrylamide, methacrylamidopropyltrimethylammonium chloride (MAPTAC), glycidyl or dicyclopentenyloxyethyl methacrylates, itaconic acid, maleic acid or its salts, maleic anhydride, alkyl or alkoxy- or aryloxy-polyalkylene glycol maleates or hemimaleates, vinylpyridine, vinylpyrrolidinone, (alkoxy-)poly(alkylene glycol) vinyl ether or divinyl ether compounds, such as methoxy-poly(ethylene glycol) vinyl ether, poly(ethylene glycol) divinyl ether, alone or as a mixture of at least two aforementioned monomers.

Preferably, these are alkyl acrylates and methacrylates, butyl acrylate in particular, 2-ethylhexyl acrylate, isobornyl acrylate and methacrylate, 4 tert-butylcyclohexyl acrylate, methyl methacrylate, acrylic and methacrylic acids and even more preferably butyl acrylate, styrene, methacrylic acid, and methyl methacrylate.

The acrylic and styrenic monomers are used for the synthesis of step 1 in the context of the process of the invention; the methacrylic and styrenic monomers are used for the synthesis of step 2 in the context of the process of the invention.

The monomers of step 1 are preferably chosen from butyl acrylate, 2-ethylhexyl acrylate and styrene, alone or in combination, and the monomers of step 2 are chosen from methyl methacrylate, methacrylic acid and styrene, alone or in combination.

In step 1 of the process of the invention, the nitroxide/monomer molar ratio is between 1/50 and 1/1000.

As regards the mercaptans used in step 2 of the process of the invention, these are mercaptans of any type designated R-SH with R being an alkyl radical which is linear or non-functionalized or not, having from 3 to 12 carbon and preferably from 4 to 8 carbon. Mention may be made in particular of mercaptoethanol, mercaptopropanol, mercaptobutanol, mercaptoacetic acid, mercaptopropionic acid, butyl, octyl and n-dodecyl mercaptan, alone or in combination. Preference is given to butyl or octyl mercaptan, alone or in mixtures.

The suspension agent used in the context of the invention is a typical suspension agent known to those skilled in the art. This can be polyvinyl alcohol, polyvinylpyrrolidone, copolymers of (meth)acrylic acid, or else copolymers of 2-acrylamido-2-methylpropanesulfonic acid, preferably polyvinyl alcohol or copolymers of 2-acrylamido-2-methylpropanesulfonic acid, and more preferably the copolymers of 2-acrylamido-2-methylpropanesulfonic acid. This suspension agent is described in EP0683182 in Example 1.

The suspension agent is present in an amount of between 0.5 and 4% by mass relative to the aqueous phase.

Optionally, inorganic particles can be added to improve the stability of the suspension.

A surfactant can be added to the aqueous phase in an amount of between 0 and 10 000 ppm relative to the aqueous phase, preferably between 0 and 5000 ppm, more preferably between 0 and 400 ppm. It may be any type of ionic or nonionic surfactant.

A water-soluble initiator is added at the end of polymerization, when the suspension to be polymerized has reached a conversion greater than 95%, chosen for example from persulfates and in particular potassium persulfate in an amount which may vary from 0.1 to 2% and preferably between 0.1 and 1% by mass relative to the total organic phase.

The water-soluble initiator makes it possible, at the end of the synthesis, to convert the last small percentages of monomers into a shell which attaches to the beads obtained in the process of the invention.

According to one aspect which is a subject of the invention, an additional amount of the monomers of step 2 of between 1 and 10% by mass in relation to the amount of monomers of steps 1 and 2 and preferably between 3 and 7% by mass can be added together with the water-soluble initiator.

The mass ratio of the aqueous phase/organic phase in step 1 of the process of the invention is between 3 and 10 and preferably between 4 and 8.

During step 2 of the process of the invention, the molar ratio of monomers (acrylic and/or styrenic)/methacrylic monomers is between 25/45 and 70/30 and preferably between and 55/45.

During this step 2, a mercaptan is introduced with a mercaptan/nitroxide molar ratio of between 0.2 and 0.8 and preferably between 0.4 and 0.6.

The stirring depends on the reactor used. For example, for a 20-liter reactor with impeller-type stirring element, it is several hundred revolutions per minute. For a 5000-liter reactor, it is between 100 and 250 revolutions per minute, still with an impeller-type stirring element. Other types of agitation can be used in the context of the present invention.

The polymerization temperature is between 15 and 150° C. and preferably between 100 and 135° C., more preferably between 125 and 135° C.

The weight-average molecular mass of the compositions obtained by the process of the invention is between 5000 and 300 000 g/mole and preferably between 10 000 and 200 000 g/mole with a dispersity index of between 2 and 4 and preferably between 2.5 and 3.3. According to one aspect of the invention, the compositions are preferably compositions of diblock copolymers and random copolymers derived from a monoalkoxyamine.

According to another aspect of the invention, the compositions are preferably compositions of triblock copolymers and random copolymers derived from a dialkoxyamine.

The invention relates to the beads obtained using the process of the invention. They are in the form of spheres whose average diameter by weight is between 5 and 600 μm and preferably between 50 and 400 μm, more preferably between 50 and 250 μm, measured by laser diffraction in a dry process using an instrument from the company Malvern. The beads consist of a nanostructured material consisting of a matrix of one of the blocks and a dispersed phase of the other block, and of a continuous shell of a hard phase of Tg>20° C., said shell having a thickness varying from 30 to 150 nm.

Beads having a continuous shell are a preferred aspect of the beads obtained using the process of the invention.

The invention also relates to the compositions obtained using the process of the invention, because they are different both in their analytical aspect and in their properties from those obtained with the other processes (solvent, bulk, emulsion).

The invention also relates to the uses of the compositions of the invention or of the beads of the invention for manufacturing objects by molding, injection, compression or extrusion.

The invention also relates to the use of the beads obtained with the process of the invention in the field of three-dimensional printing called laser sintering to form objects.

Laser-beam powder sintering technology is used to manufacture three-dimensional objects, such as prototypes or models but also functional parts, in particular in the motor vehicle, nautical, aeronautical, aerospace, medical (prostheses, auditory systems, cell tissues, and the like), textile, clothing, fashion, decorative, electronic casing, telephony, home automation, computing or lighting fields.

In the laser sintering technique, a thin layer of powder is deposited on a horizontal plate held in a chamber heated to a certain temperature. The laser contributes the energy necessary to sinter the powder particles at different points of the powder layer according to a geometry corresponding to the object, for example using a computer having, in memory, the shape of the object and reproducing this shape in the form of slices. Subsequently, the horizontal plate is lowered by a value corresponding to the thickness of a powder layer (for example, between 0.05 and 2 mm and generally of the order of 0.1 mm), then a new powder layer is deposited and the laser contributes the energy necessary to sinter the powder particles according to a geometry corresponding to this new slice of the object, and so on. The procedure is repeated until the entire object has been manufactured. An object surrounded by non-sintered powder is obtained inside the chamber. The parts which have not been sintered have thus remained in the powder state. After complete cooling, the object is separated from the powder, which can be reused for another operation.

Description of Measurement Methods:

Atomic force microscopy. The use of this microscopy makes it possible to visualize the soft zones and the hard zones of a sample, here a planed section of bead encased in epoxy resin. The samples are observed in "tapping" mode.

Liquid adsorption chromatography (LAC) is a chromatographic method.

Adsorption liquid chromatography is a technique for separating complex mixtures of polymers from which each of the constituents thereof can be eluted according to its chemical composition, therefore independently of its molar mass.

The samples are injected into the WATERS ALLIANCE 2695 HPLC apparatus.

The eluent is a gradient (hexane/THF) acidified with 5% acetic acid and stabilized with BHT.

The polar column used is a SunFire Prep Silica 5 μm 4.6*250 mm column (CAP-Sunfire-02).

The flow rate is 1 ml/min and the volume of sample injected is 30 μl.

The detector used is an Agilent ELSD (Evaporative Light Scattering Detector) 380 and a Waters 2487 Dual UV 254 nm.

For liquid adsorption chromatography, the polymer samples were prepared at 2 g/l in THF. The PMMA and PABu samples will serve as standards so that they can be identified at the end of the analysis of the PMMA-PABu/PMMA triblock. A volume of 30 μL is injected.

Yellowness index: It is measured according to the YIE313 standard (NF ISO 7724-3 1988). The yellow index (YI) is measured on a Colorquest HunterLab (conditions: Illuminant: D65, Angle of observation: 10°, Mode of observation: Transmission).

Molecular masses. They are measured by SEC, using polystyrene standards.

EXAMPLES

Example 1 (Invention): Synthesis of a Composition According to the Process of the Invention The starting alkoxyamine used is N-(2-methylpropyl)-N-(1-diethylphosphono-2,2-dimethylpropyl)-O-(2-carboxyprop-2-yl)hydroxylamine whose expanded formula is as follows:

[Chem 9]

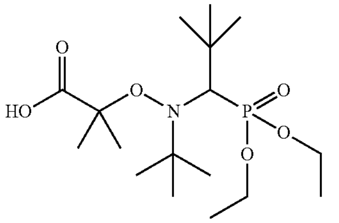

It is available from Arkema under the name Blocbuilder® MA

The following steps are carried out:

1: Addition of Blocbuilder MA® to butanediol diacrylate to form a dialkoxyamine (7) called diamins, the starting point of the triblock copolymer.

2: Synthesis of a dialkoxyamine polybutyl acrylate (PABu) by reaction of butyl acrylate with dialkoxyamine.

3: Synthesis in suspension of a PMMA-PAbu-PMMA triblock copolymer composition.

1/Synthesis of the diamins:

The diamins is prepared in ethanol from Blocbuilder MA® (Arkema) and butanediol diacrylate (BDMA). A 1 L reactor is inerted with nitrogen. 114 g of ethanol are introduced into a reactor, 60 g of Blocbuilder MA® and 15.7 g of BDMA. The reactor is stirred at 100 rpm and heated to 80° C. (1 bar) for 4 hours. The solids content is 35%. The temperature is lowered to 25° C. After evaporation of the ethanol, the diamins is recovered and can be used as is.

2/Synthesis of the Poly(Butyl Acrylate) Block, Step 1 of the Process of the Invention:

A 5 L reactor is used.

The aqueous phase is prepared directly in the reactor and stirred at 500 rpm for 30 minutes.

Aqueous Phase:

Demineralized water: 1800 g

Suspension agent: copolymer of 2-acrylamido-2-methylpropanesulfonic acid: 15.3 g (305.8 g for a 5% solution)

Surfactant: a polyethoxylated C12-C14 alcohol (50 ethoxylated units) is used, for example available from Cognis, Disponil® LS500: 0.5 g The organic phase is prepared in another container:

Diamins: 16.1 g

Butyl acrylate: 350 g

The organic phase is added after vacuum and nitrogen cycles have been alternated in the reactor. The suspension is then heated with the following cycle:

Segment 1 Initial temp. 20
Final temp. 130
Time 90
Segment 2 Initial temp. 130
Final temp. 130
Time 50
Segment 3 Initial temp. 130
Final temp. 20
Time 45

3/Synthesis of a Polymethyl Methacrylate-Poly(Butyl Acrylate)-Polymethyl Methacrylate Copolymer Composition, Step 2 of the Process of the Invention:

The organic phase is prepared from methyl methacrylate and mercaptan.

Methyl methacrylate: 397.5 g

Octyl mercaptan and butyl mercaptan (50/50): 1.6 g

The organic phase is introduced into the reactor by reduction in pressure.

The mixture is heated according to the cycle:

Initial temp. 20°

Final temp. 130°

Time 90 mins

Segment 1 Initial temp. 130°

Final temp. 130°

Time 90 mins

Segment 2 Initial temp. 130°

Final temp. 20°

Time 60 mins

4/Synthesis of the Shell:

The shell is formed according to the following recipe:

Demineralized water: 92 g

Potassium persulfate: 0.73 g

The polymerization takes place at 85° C. for 1 hour 30 minutes.

The suspension is then recovered. The beads are filtered and washed twice with water and dried in an oven at 50° C.

The product has the following properties:

Peak molar mass: Mp=110 000 g/mol

Number-average molar mass: Mn=55 000 g/mol

Mass-average molar mass: Mw=160 000 g/mol

Polydispersity: Ip=2.9

The mass composition determined by NMR is 45% PABu, and 55% PMMA.

Example 2 (Comparative)

Example 1 is repeated but without addition of mercaptan at step 3.

The process of the invention makes it possible to improve the kinetics (FIG. 1) and leads to better stability of the composition obtained (FIGS. 2 and 3). The presence of a mercaptan during step 3 is decisive for the stability of the composition obtained.

Example 3: Bulk Synthesis Process

A comparative composition of a triblock copolymer prepared with the bulk process is carried out.

In a 1 L reactor equipped with a double jacket, 320 g (i.e. 2.5 mol) of butyl acrylate and 6.8 g (i.e. 7.1 mmol) of polyalkoxyamine prepared in example 1 step 1 are introduced at room temperature. After several degassings with nitrogen, the reaction medium is brought to 115° C. and this temperature is maintained by thermal regulation for 5 hours. Samples are taken throughout the reaction in order to determine the kinetics of the polymerization by gravimetry (measurement of dry extracts) and to follow the evolution of the molecular masses according to the conversion.

When the conversion of 80% is reached, the reaction medium is cooled to 60° C., and the residual butyl acrylate is removed by evaporation under vacuum.

At 60° C., 391 g (i.e. 3.7 mol) of methyl methacrylate and 78 g of toluene are then added. The reaction medium is then heated at 95° C. for 2 h (conversion=50%). After return to 60° C. and dilution with 78 g of toluene, the PMMA-PAbu-PMMA copolymer is withdrawn from the reactor and the residual monomer and solvent are removed by evaporation under vacuum.

The copolymer obtained has a peak molecular mass (Mp) of 100 000 g/mole.

Example 4: Evaluation of the yellow index on 50/50 mixtures by mass of PMMA with compositions of the invention from example 1 and compositions obtained according to example 3. These mixtures are obtained by extrusion then injection of specimens at 240° C. The yellow index (YI) is measured on a Colorquest HunterLab (conditions: Illuminant: D65, Angle of observation: 10°, Mode of observation: Transmission).

The yellow index result in table 1 shows a much higher quality of the sample of the mixture using the composition of the invention. A low yellow index is always desired in optical applications.

TABLE 1

| | PMMA/Copolymer of example 3 | PMMA/composition of the invention |
|---|---|---|
| Mp (g/mol) | 100 000 | 110 000 |
| YIE313 (NF ISO 7724-3 March 1988) | 13.7 + 0.3 | 1.3 + 0.1 |

Example 5/The Applicant compared the rheology of the compositions obtained according to example 1 of the invention and according to example 3 by measuring the melt index (MFI, melt flow index).

The results are shown in table 2. They demonstrate that the compositions have different characteristics. At a similar weight-average molecular mass, the compositions of the invention appear more fluid, which has an advantage for processing.

TABLE 2

| | Triblock copolymer synthesized in example 3 | composition of the invention |
|---|---|---|
| Mp (g/mol) | 100 000 | 110 000 |
| MFI (g/10 min) ZWICK Melt-indexer (4M021) Temperature (° C.) = 230 Load (kg) = 3.8 kg | 12 | Measurement impossible because composition too fluid |
| MFI (g/10 min) ZWICK Melt-indexer (4M021) Temperature (° C.) = 230 Load (kg) = 1.2 kg | — | 18 |

Example 6

Stability of Mixing with a Polyoxymethylene (POM):

Mixture of POM/block copolymer or compositions of the invention:

Block copolymers are used to improve the impact properties of commodity polymers. Block copolymers have a block with a low glass transition temperature (<0° C., for example butyl acrylate) and a block with a high glass transition temperature (>90° C., like PMMA). They allow the impact resistance of a number of materials to be improved, such as polyoxymethylene. A few percent of copolymers are added to the polymer to obtain a material with improved impact properties. However, block copolymers synthesized by a solvent route can degrade polyoxymethylene and lead to the formation of formaldehyde during the usage of the materials (mixtures formed at temperature). Synthesis by an aqueous route according to the process of the invention allows the composition obtained to limit the degradation of the POM during the mixing steps and to obtain a material with improved properties.

Mixtures were made at 200° C. containing 100%, then 98% of POM and 2% of a composition of example 1 of the invention and 2% of copolymer of example 3. Formaldehyde formation is measured by UHPLC/UV (acetonitrile/H2O mobile phase, 50/50 isocratic mode). The method involves the aqueous extraction of the formaldehyde from the formulated POM and a derivatization with 2,4-dinitrophenylhydrazine (DNPH) in order to quantify the compound with a UV detector (table 3). The addition of the composition of the invention does not affect the stability of the POM (no degradation observed by formation of formaldehyde during mixing at 200° C.); table 3.

TABLE 3

| | Formation of formaldehyde (mg/g) |
|---|---|
| POM | 0.02 |
| POM + 2% triblock from example 3 | 13.5 |
| POM + 2% composition of the invention, example 1 | 0.05 |

The invention claimed is:

1. A process for suspension polymerization of (meth) acrylic and/or styrenic monomers to obtain beads of a composition comprising at least one block copolymer, the process comprising the following two successive synthesis steps:

Step 1:

in a stirred reactor comprising water, 0.5 to 4% by mass of a suspension agent constituting the aqueous phase, introducing an organic phase consisting of at least one alkoxyamine and at least one acrylic and/or styrenic monomer with a nitroxide/monomer molar ratio of between 1/50 and 1/1000 and an aqueous phase/organic phase mass ratio of between 3 and 10, the alkoxyamine carrying at least one nitroxide corresponding to the following formula:

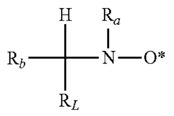

where $R_L$ is a monovalent group with a molar mass greater than 15.42 g/mol; and $R_a$ and $R_b$ are identical or different alkyl groups having from 1 to 40 carbon atoms, optionally linked together so as to form a ring and optionally substituted by hydroxyl, alkoxy or amino groups;

polymerizing monomers in a suspension to a minimum mass conversion rate of 80% at a temperature of between 15° C. and 140° C.;

Step 2:

introducing into the previous polymerized suspension at least one methacrylic and/or styrenic monomer and at least one mercaptan with a mercaptan/nitroxide molar ratio of between 2/1000 and 8/1000 and with a mass ratio of the monomers (acrylic and/or styrenic from step 1)/(methacrylic and/or styrenic monomers from step 2) of between 25/75 and 70/30;

polymerize with stirring the monomers to a minimum conversion rate of 95% at a temperature of between 15° C. and 140° C.;

introducing an initiator soluble in the aqueous phase to complete the polymerization to a minimum mass conversion rate of 99% with a rate of between 0.1 and 2% relative to the mass of total organic phase; and filtering, washing, and then drying the beads.

2. The process as claimed in claim 1, wherein a surfactant is added to the aqueous phase during Step 1 in proportions varying from 1 to 10,000 ppm.

3. The process as claimed in claim 1, wherein the monomers of Step 1 are chosen from butyl acrylate, 2-ethylhexyl acrylate and styrene, alone or in combination, and the monomers of Step 2 are chosen from methyl methacrylate, methacrylic acid and styrene, alone or in combination.

4. The process as claimed in claim 1, wherein the nitroxide is N-tert-butyl-1-diethylphosphono-2,2-dimethylpropyl nitroxide.

5. The process as claimed in claim 1, wherein the alkoxyamine is 2-([tert-butyl [1-(diethoxyphosphoryl)-2,2-dimethylpropyl]amino]oxy)-2-methylpropionic acid.

6. The process as claimed in claim 1, wherein the alkoxyamine is the addition product of 2-([tert-butyl[1-(diethoxyphosphoryl)-2,2-dimethylpropyl]amino]oxy)-2-methylpropionic acid and butanediol diacrylate.

7. A composition obtained from the process of claim 1.

8. The composition as claimed in claim 7, having a weight-average molecular mass of between 10,000 and 200,000 g/mol with a dispersity index of between 2 and 4.

9. A bead obtained from the process of claim 1.

10. A process for three-dimensional printing or for manufacturing objects by molding, injection, compression or extrusion, the process comprising adding the beads obtained from the process of claim 1.

* * * * *